United States Patent [19]

Inagaki et al.

[11] Patent Number: 5,382,558
[45] Date of Patent: Jan. 17, 1995

[54] HEAT RESISTANT LAYERED POROUS SILICA AND PROCESS FOR PRODUCING THE SAME

[75] Inventors: Shinji Inagaki; Yoshiaki Fukushima; Akane Okada; Kazuhiro Fukumoto, all of Aichi; Kazuyuki Kuroda, Tokyo, all of Japan

[73] Assignee: Kabushiki Kaisha Toyota Chuo Kenkyusho, Tokyo, Japan

[21] Appl. No.: 87,440

[22] Filed: Jul. 2, 1993

Related U.S. Application Data

[63] Continuation-in-part of Ser. No. 937,032, Aug. 31, 1992, which is a continuation-in-part of Ser. No. 820,167, Jan. 13, 1992.

[30] Foreign Application Priority Data

Jul. 3, 1992 [JP] Japan .................... 4-200255

[51] Int. Cl.⁶ .................. B01J 20/10; B01J 20/28
[52] U.S. Cl. ..................... 502/407; 502/11; 502/527
[58] Field of Search .............. 502/407, 232, 11

[56] References Cited

U.S. PATENT DOCUMENTS

| | | | |
|---|---|---|---|
| 3,581,782 | 6/1971 | Onufer | 55/387 |
| 3,727,379 | 4/1973 | Bijleveld | 55/74 |
| 3,763,839 | 10/1973 | Alquist | 123/519 |
| 3,844,739 | 10/1974 | Alfrey | 55/74 |
| 4,216,188 | 8/1980 | Shabrai | 423/118 |
| 4,518,703 | 5/1985 | Young | 502/232 |
| 4,703,029 | 10/1987 | Rieck | 502/232 |
| 4,748,082 | 5/1988 | Dorr | 428/703 |
| 4,803,060 | 2/1989 | Occelli | 502/61 |
| 4,919,907 | 4/1990 | Occelli | 502/61 |
| 4,968,652 | 11/1990 | Johnson | 502/63 |
| 5,057,296 | 10/1991 | Beck | 423/277 |
| 5,063,039 | 11/1991 | Valyocsik | 502/232 |
| 5,064,790 | 11/1991 | Bedard | 428/328 |
| 5,098,684 | 3/1992 | Kresege et al. | 423/277 |
| 5,102,643 | 4/1992 | Kresege et al. | 423/328 |
| 5,139,760 | 8/1992 | Ogawa | 428/402 |
| 5,183,559 | 2/1993 | Kirker et al. | 502/84 |

OTHER PUBLICATIONS

Tsuneo Yanagisawa, et al., "The Preparation of Alkyltrimethylammonium-Kanemite Complexes and Their Conversion to Microporous Materials"; The Chemical Society of Japan, vol. 63, No. 4, Apr., 1990, pp. 988–992.

*Primary Examiner*—Carl F. Dees
*Attorney, Agent, or Firm*—Stroock & Stroock & Lavan

[57] ABSTRACT

A heat resistant layered porous silica having a honeycomb porous structure comprises a plurality of waved or bent sheet layers of crystalline layered silicate superposed one after another, and the neighboring sheets are partially bonded by siloxane bonding. The spacing between the neighboring sheet layers is narrowed toward the bonded portions and expanded at other portions to thereby form fine pores. The layered porous silica contains alkali metal ions in an amount of 0.2% by weight or less and has a specific surface area of 1,000m²/g or more.

The layered porous silica has a large specific surface area, and exhibits an excellent heat resistance and adsorption of organic substances such as fuel.

21 Claims, 5 Drawing Sheets

HEAT RESISTANT LAYERED POROUS SILICA AND PROCESS FOR PRODUCING THE SAME

This is a continuation-in-part application of application Ser. No. 07/937,032, filed Aug. 31, 1992 for FUEL-SORBING DEVICE USING LAYERED POROUS SILICA, which is a continuation-in-part of application Ser. No. 07/820,167, filed Jan. 13, 1992 for POROUS MATERIAL COMPOSED OF LAYERED SILICA AND METAL OXIDE AND A PROCESS FOR MANUFACTURING THE SAME.

BACKGROUND OF THE INVENTION

1. Field of the Invention

The present invention relates to a heat resistant layered porous silica used as catalyst carriers and as adsorbents of organic substances, etc. The present invention also relates to a process for producing the same.

2. Description of the Related Art

The catalysts for the catalytic cracking of petroleum and for the purification of exhaust gas are exposed to a relatively high temperature of 700° C. or even higher. Accordingly, carriers for such catalysts are expected to maintain a large specific surface area even when they are brought under high temperatures, so that the active components might be kept well dispersed thereon.

However, the materials conventionally used as carriers such as zeolite, silica-alumina, alumina, and silica gel do not always exhibit a sufficiently high heat resistance, or at the expense of desirable pore size distribution, if any.

There is also a demand for an adsorbent having a high adsorption capacity used, e.g., as an absorber to be charged in automobile canisters for absorbing the evaporated fuel.

Recently, a porous silica having a uniform pore size distribution was synthesized (Bull. Chem. Soc. Jpn., 63 (1990), pp. 988–992). This type of porous silica can be obtained by expanding the interlayer spacing between the crystalline layered silicate.

The cross section of this porous silica yields a honeycomb porous structure, because the layered sheets of silica each take a finely waved structure, and the neighboring silica sheets partially develop siloxane bonding at bent portions thereof to form a three dimensional framework having fine pores being uniformly distributed in the structure.

The layered porous silica above can be produced by a process which comprises: synthesizing a crystalline layered silicate; dehydrating the crystalline layered silicate thus obtained; and subjecting the silicate to ion exchange using an organic cation and rinsing with water, thereby introducing the organic cation between the crystalline layered silicate sheets to expand the interlayer spacing and removing alkali metal ions such as sodium ($Na^+$).

The process above, however, undergoes the aggregation of the crystalline layered silicate on dehydrating thereof. Then, the alkali metal ions cannot be sufficiently removed by the ion exchange treatment and rinsing with water. The residual alkali metal ions between the sheet layers reduce the specific surface area due to their crystallization into cristobalite or the like.

Figure 3:
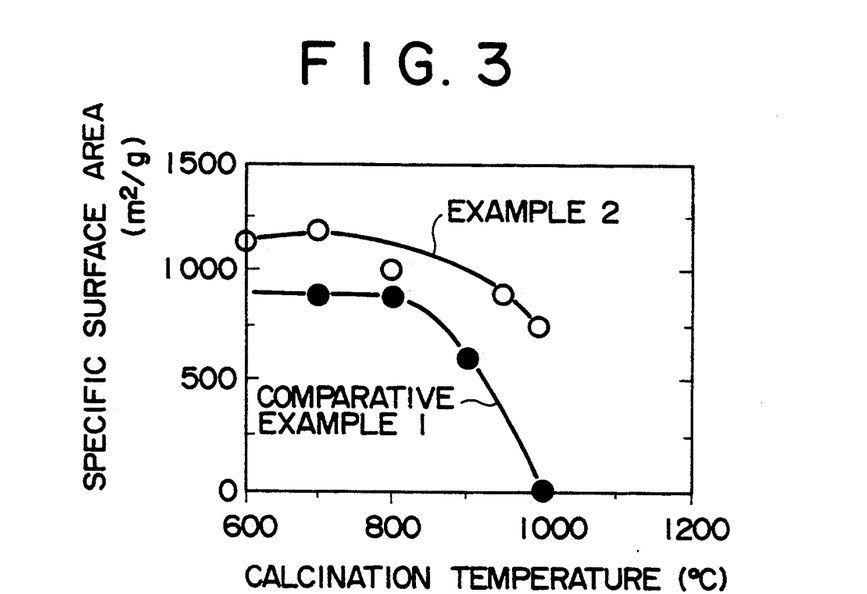
FIG. 3 is a graph showing the change in specific surface area of the layered porous silica with increase in the calcination temperature according to Example 2.

More specifically, the layered porous silica above described has a small specific surface area, 900 $m^2/g$ at the most, and the specific surface area thereof considerably decreases in a temperature range of 800° C. or higher. Therefore, the layered porous silica exhibits only such a poor heat resistance as illustrated in FIG. 3.

SUMMARY OF THE INVENTION

In the light of the aforementioned circumstances, the present invention provides a layered porous silica having a large specific surface area and an excellent heat resistance. The present invention also provides a process for producing the same.

The heat resistant layered porous silica according to the present invention is characterized by that it is a layered porous silica having a honeycomb porous structure comprising a plurality of waved sheet layers of crystalline layered silicate, which are superposed one after another so that the spacing between the neighboring sheet layers is narrowed toward bent portions defining ridges thereof where the sheet layers are bonded by siloxane bonding and the spacing is expanded at parts between the bonded portions to form fine pores.

The layered porous silica contains 0.2% by weight or less of alkali metal ions and has a specific surface area of 1,000 $m^2/g$ or more.

If the layered porous silica contains an alkali metal ion in excess of 0.2% by weight, the atoms become mobile at a relatively low temperature and undergo crystallization into cristobalite and the like. As a result, the specific surface area of the layered porous silica decreases, and the heat resistance thereof is impaired.

If the specific surface area of the layered porous silica is reduced to less than 1,000 $m^2/g$, the activity of the catalyst cannot be fully exhibited when loaded on the layered porous silica. Furthermore, the adsorption capacity for organic substances and the like will be impaired when used as an adsorbent.

Figure 1A:
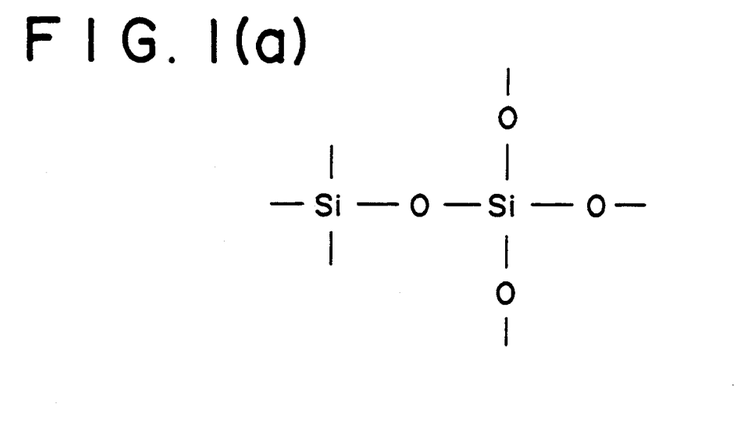
FIGS. 1(a), 1(b) and 1(c) illustrates the layered porous silica described in Example 1 and 2.
Figure 1B:
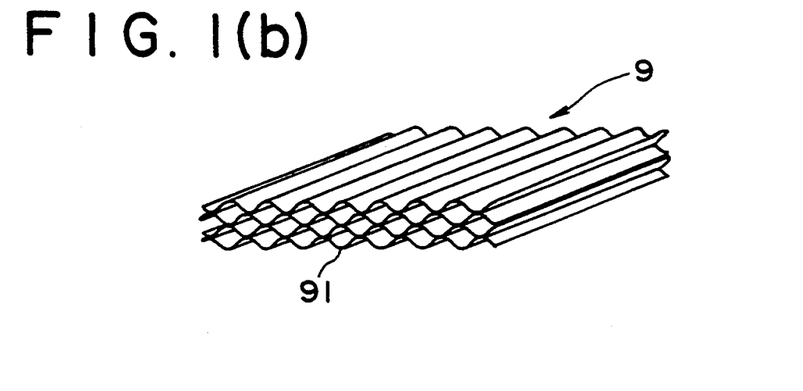
Figure 1C:
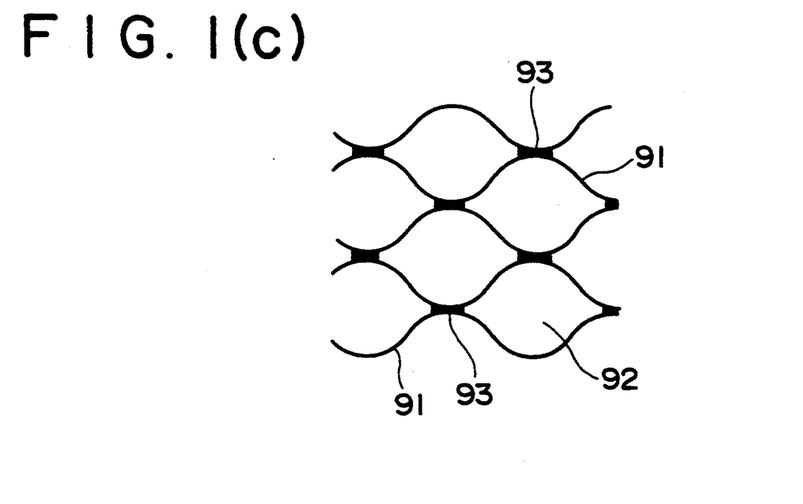

The layered porous silica according to the present invention, as shown in FIGS. 1(a) to 1(c), has an $SiO_2$ framework and comprises tabular sheets 91 being superposed one after another, each of the sheets 91 being waved or bent. The sheets 91 are each partially bonded with another by a siloxane bonding at the bent portions 93 to establish a honeycomb structure with fine pores 92. The diameter of the pores depend on the size of the organic cation used in the process of producing the layered porous silica, but it generally is in the range of from 1 to 60Å, and more preferably, from 10 to 60Å.

The sheet layer is a silicate layer formed by two dimensional bonding of $SiO_4$ tetrahedra, the sheet of which can be bent at the bonding oxygen atoms. The sheet layers are free of octahedra, such as magnesium ions ($Mg^{2+}$) and aluminum ions ($Al^{3+}$), which will prevent bending of sheets. A plurality of sheet layers form a multilayered structure with alkali metal ions, i.e., the exchangeable cations such as $Na^+$, and $H^+$ being incorporated therebetween.

Specifically, preferred crystalline layered silicate include kanemite ($NaHSi_2O_5 \cdot 3H_2O$). Other typical crystalline layered silicates include sodium disilicate ($Na_2Si_2O_3$), makatite ($Na_2Si_4O_9 \cdot 5H_2O$), ilerite ($Na_2Si_8O_{17} \cdot xH_2O$), magadiite ($Na_2Si_{14}O_{29} \cdot xH_2O$), and kenyaite ($Na_2Si_{20}O_{41} \cdot xH_2O$), but the present invention is not limited thereto.

The layered porous silica according to the present invention can be produced by a process for producing a heat resistant layered porous silica comprising:

expanding interlayer spacings of a crystalline layered silicate containing not less than 10% by weight of water, by exchanging interlayer alkali metal ions being present in the crystalline layered silicate for cations of an organic substance to thereby introduce the cations of the organic substance into the spacings between the layers of the crystalline layered silicate;

rinsing the ion-exchanged crystalline layered silicate to remove the free alkali metal ions which were released by the ion exchange; and calcining the ion-exchanged and rinsed crystalline layered silicate to obtain layered porous silica by removing cations of the organic substance.

The crystalline layered silicate used in the present invention may be a naturally produced silicate, or a synthesized silicate obtained from amorphous silicate. Amorphous silicates include a commercially available sodium silicate powder and a powder obtained by drying water glass.

In synthesizing a crystalline layered silicate, kanemite for example, it is most preferred to use an amorphous sodium silicate containing $Na_2O$ and $SiO_2$ at an $SiO_2/Na_2O$ ratio of 2. The amorphous sodium silicate is then calcined in air in the temperature range of from 650° to 750° C. to obtain a crystalline $\delta$-$Na_2Si_2O_5$. At a temperature lower than 650° C., however, only a $\beta$- or $\gamma$-$Na_2Si_2O_5$ can be obtained, and at a temperature higher than 750° C., an $\alpha$-$Na_2Si_2O_5$ is obtained. The $\alpha$-, $\beta$-, and $\gamma$-$Na_2Si_2O_5$ however, will not serve the formation of a crystalline layered silicate by reaction with water.

The $\delta$-$Na_2Si_2O_5$ thus obtained is then dispersed in water of about 2 to 50 times the volume of the silicate. The dispersion is then stirred for a duration of from 1 to 5 hours and filtered. In this manner, a part of $Na^+$ ions in the $\delta$-$Na_2Si_2O_5$ is exchanged for $H^+$ ions in water, resulting in the formation of kanemite ($NaHSi_2O_5 \cdot 3H_2O$).

The crystalline layered silicate used in the present invention should contain 10% by weight or more of water. If the water content is less than 10% by weight, the crystalline layered silicate may undergo the aggregation to impair dispersibility thereof in the subsequent step of interlayer expansion treatment. Then, the ion exchange reaction between the cations of organic substances and the alkali metal ions would insufficiently take place. With a water content of 10% by weight or more, the crystalline layered silicate can be well dispersed in water, and hence the ion exchange of interlayer alkali metal ions for cations of the organic substances is conducted smoothly within a short period of time.

The layered porous silica obtained as a result yields a specific surface area of 1,000 m²/g or more to give an excellent heat resistant layered porous silica containing 0.2% by weight or less of residual alkali metal ions.

In the step of expanding the interlayer spacings as described in the foregoing, alkali metal ions present in the crystalline layered silicate are exchanged for the cations of organic substances. Where the cations of the organic substances are introduced, the interlayer spacings of the crystalline layered silicate are expanded because the cations of the organic substances are bulky as compared with the alkali metal ions. Accordingly, the sheet layers are bent in such a manner to surround the cations of the organic substances. At the same time, a siloxane bonding (Si—O—Si) develops between two neighboring sheet layers at the parts other than those where the cations of the organic substances are introduced, by dehydration condensation of silanol (Si—OH) groups of the neighboring sheet layers. In this manner, the neighboring sheet layers are partly joined by siloxane bonding to construct a three dimensional honeycomb layered structure.

The cations of organic substances for use in the present invention include those of an alkyltrimethylammonium, a dimethyldialkylammonium, an alkylammonium, and benzyl-tri-methylammonium.

The ion exchange step is preferably conducted while controlling the pH in the range of from 8 to 9, and more preferably, it is then followed by heating to a temperature range of from 30° to 90° C. before carrying out calcining.

The rinsing step of the process according to the process of the present invention is conducted for the purpose of removing the alkali metal ions which were released from the crystalline layered silicate by the ion exchange treatment, the counter ions of the cations of the organic substances, and the non-reacted cations of the organic substances. In particular, the free alkali metal ions are rinsed off and removed completely in this step to thereby reduce the alkali metal content of the crystalline layered silicate to 0.2% by weight or less.

The step of forming porous silica according to the process of the present invention comprises calcining the crystalline layered silica to remove the cations of the organic substances introduced into the interlayer spacings of the crystalline layered silicate, to thereby form fine pores. This step also stabilizes the three dimensional framework constructed by the siloxane bonding.

The calcination is preferably conducted in a temperature range of from 600° to 1,200° C. in an oxidizing atmosphere. If the calcination is carried out at a temperature lower than 600° C. or in an atmosphere other than an oxidizing one, the cations of the organic substances may not be fully removed. If the step is conducted at a temperature higher than 1,200° C., on the other hand, the calcination proceeds excessively and results in destroying the fine pores and decreasing the specific surface area.

The layered porous silica according to the present invention hardly crystallizes even at a high temperature range of 800° C. or more and retains stable fine pores, because it contains alkali metal ions in an amount of as small as 0.2% by weight or less. It can be seen, therefore, that the layered porous silica of the present invention exhibits an excellent heat resistance.

The layered porous silica of the present invention also has a large specific surface area of 1,000 m²/g or more. It therefore provides favorable adsorption properties for use as catalyst carriers, absorptive materials for organic substances such as fuels, etc.

Furthermore, the layered porous silica of the present invention contains less isolated hydroxyl groups on the surface thereof as compared with the commercially available silica gel. In general, the surface is rendered more hydrophobic in inverse proportion to the amount of the surface isolated hydroxyl groups. It can be therefore presumed that the surface of the layered porous silica is hydrophobic. This signifies that the layered porous silica according to the present invention exhibits superior adsorption of organic substances such as octane and fuels.

As described in the foregoing, the present invention provides a heat resistant layered porous silica which exhibits both an excellent adsorption to organic substances such as fuels and excellent heat resistance, and a process for producing the same.

DETAILED DESCRIPTION OF PREFERRED EMBODIMENTS

The present invention is illustrated in greater detail referring to examples below. It should be understood, however, that the present invention is not to be construed as being limited thereto.

EXAMPLES 1 and 2

A layered porous silica 9 according to Example 1 and 2 has an $SiO_2$ framework as shown in FIG. 1(a), and generally forms a honeycomb structure comprising waved or bent sheet layers 91 being superposed one after another, as illustrated in FIG. 1(b). The sheet layer 91 has a finely waved structure as shown in FIG. 1(c), so that the upper sheet layer 91 and the lower sheet layer 91 partly form bondings at portions 93 to yield a three dimensional framework. Fine pores 92 are formed between the neighboring sheet layers 91 and between the bonding points 93, by expanding the interlayer spacing between the sheet layers 91.

The layered porous silica 9 according to the present Example contains 0.2% by weight or less of alkali metal ions, and has a specific surface area of 1,000 $m^2/g$ or more.

The process for producing the layered porous silica of the present Example is explained below.

A crystalline layered silicate for use as a starting material was synthesized first. A powder of sodium silicate containing $Na_2O$ and $SiO_2$ at an $SiO_2/Na_2O$ ratio of 2.00 was calcined in an electric furnace at 700° C. for 6 hours. The sample thus obtained was found, by X-ray diffraction, to be formed of $\delta$-$Na_2Si_2O_5$ crystals.

Then, 150 g of the $\delta$-$Na_2Si_2O_5$ crystals obtained was immersed in 1.5 l of water, and was subjected to stirring for 3 hours. The resulting dispersion was filtered off, and the solid content in wet was divided into three portions, each of which was put into a Petri dish for air drying. By changing the duration of air drying, three samples differing in water content were prepared.

The water content of the three samples was found to be 103% by weight (a sample for Example 2), 53.9% by weight (for Example 3), and 6.6% by weight (for Comparative Example 1) respectively, taking the water content of a vacuum dried sample as the standard. The samples thus dried were confirmed by X-ray diffraction to consist of a crystalline layered silicate, i.e., kanemite ($NaHSi_2O_5 \cdot 3H_2O$).

In the subsequent step of interlayer expansion, 10 g weight on drying) each of the three kanemite samples differing in water content were dispersed in 1 l of a 0.1N aqueous solution of hexadecyltrimethylammonium chloride, and a 2N aqueous solution of HCl was added therein to control the pH thereof to 8.5. The samples were subjected to stirring while heated at 70° C. for 3 hours.

Then, the resulting dispersions were each subjected to filtration in the rinsing step, and each of the solid content thus obtained was rinsed four times with 1 l of water.

In the subsequent pore-forming step, each of the samples obtained was calcined at 700° C. under flow of air to synthesize three types of layered porous silica.

Three types of layered porous silica thus obtained from kanemite containing water in an amount of 103%, 53.9%, and 6.6% were used as a sample for Example 2, Example 3, and Comparative Example 1, respectively. The diameter of the fine pores of these layered porous silica was found to be distributed within a range of from 1 to 60Å, with an average of about 30Å.

Figure 2:
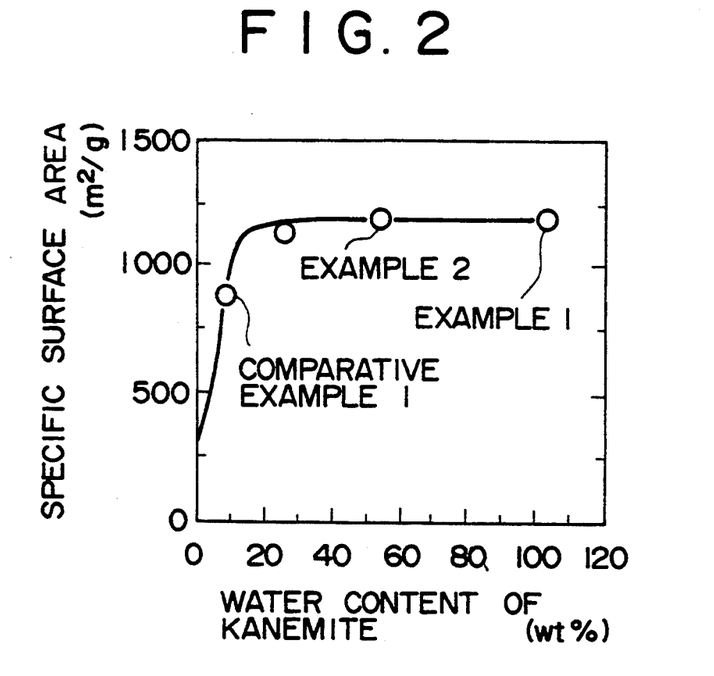
FIG. 2 is a graph showing the relation between the water content of kanemite and the specific surface area of the layered porous silica obtained in Example 1 and 2.

The relation between the water content of kanemite and the specific surface area of the resulting layered porous silica is given in FIG. 2. The specific surface area of the layered porous silica was evaluated from the amount of nitrogen adsorbed.

It was confirmed from the results shown in FIG. 2 that the layered porous silica obtained from kanemite containing 10% or more of water yields a specific surface area of 1,000 $m^2/g$ or more. On the other hand, with a kanemite containing less than 7% of water, a tendency of abrupt decrease in the specific surface area is observed on the resulting layered porous silica.

The layered porous silica of Example 2 and Comparative Example 1 were subjected to an experiment for evaluating the heat resistance. The experiment comprises heating the layered porous silica in air for 6 hours in the temperature range of from 600° to 1,000° C. and measuring the specific surface area thereof in the same manner as in Example 1. The results are given in FIG. 3.

FIG. 3 reads that, at any calcining temperature, the layered porous silica obtained by the process of Example 2 has a larger specific surface area as compared with that of Comparative Example 1. Furthermore, it can be seen that the layered porous silica of Example 2 maintains a specific surface area of 750 $m^2/g$ even on calcining at 1,000° C., which is in clear contrast to the case of Comparative Example 1 in which only a small specific surface area of 10 $m^2/g$ is obtained by calcining at 1,000° C.

The layered porous silica of Example 2 and Comparative Example 1 were subjected to X-ray diffraction after calcining at 1,000° C. The layered porous silica of Example 2 was found to maintain a layered structure, whereas the layered porous silica of Comparative Example 1 was found to partially form cristobalite crystals.

EXAMPLE 3

The relation between the amount of residual sodium and the specific surface area was examined for the layered porous silica. The amount of residual sodium was measured by atomic absorptiometry. The specific surface area of the layered porous silica was measured in the same manner as in the foregoing Examples. The results are given in FIG. 4.

The amount of residual sodium in the layered porous silica above was varied by increasing or decreasing the repetition of rinsing in the rinsing step as described in the production process of Example 1 and 2. The rest of the procedures were the same as in Example 1 and 2.

Figure 4:
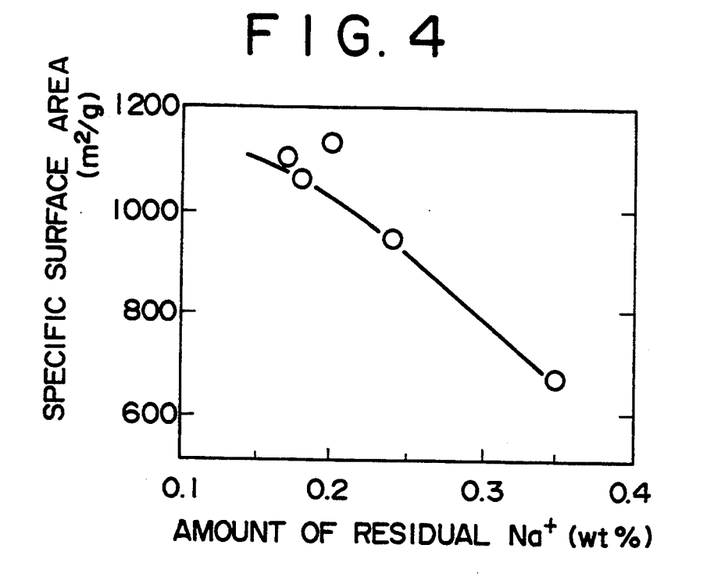
FIG. 4 is a graph showing the relation between the amount of residual sodium ion ($Na^+$) in the layered porous silica of Example 3 and the specific surface area thereof.

It can be seen from FIG. 4 that the layered porous silica maintains a specific surface area of 1,000 $m^2/g$ or more so long as the amount of residual sodium is suppressed to 0.2% by weight or less. However, with the amount of sodium in excess of 0.2% by weight, the layered porous silica is observed to considerably reduce the specific surface area thereof.

EXAMPLES 4 to 6

In Example 4 to 6, the change in specific surface area of the layered porous silica and the change in residual sodium ions were observed with varying repetition of rinsing in the rinsing step.

A crystalline layered silicate used as a starting material was synthesized first. In this step, 3,870 g of a powder of sodium silicate was calcined in an electric furnace at 700° C. for 6 hours. Then, 3,000 g of the $\delta$-$Na_2Si_2O_5$ crystals thus obtained was immersed in 30 l of water, and was subjected to stirring for 3 hours. The resulting dispersion was filtered off to obtain kanemite containing 100% by weight of water as the solid content.

In the subsequent step of interlayer expansion, 3,000 g (weight on drying) of the resulting kanemite was dispersed in 60 l of a 0.1N aqueous solution of hexadecyltrimethylammonium chloride, and a 2N aqueous solution of HCl was added therein to control the pH of the dispersion to 8.5. The dispersion was then kept stirring at 70° C. for 3 hours.

Then, the resulting dispersion was subjected to filtration in the rinsing step, and each of the solid content thus obtained was rinsed with 120 l of water. Five types of samples differing in repetition of rinsing from 0 to 5 times were prepared in this step.

In the subsequent pore-forming step, the samples obtained above were each calcined at 700° C. under flow of air for 6 hours to synthesize five types of layered porous silica for Comparative Example 2, Comparative Example 3, and Example 4 to 6.

Figure 5:
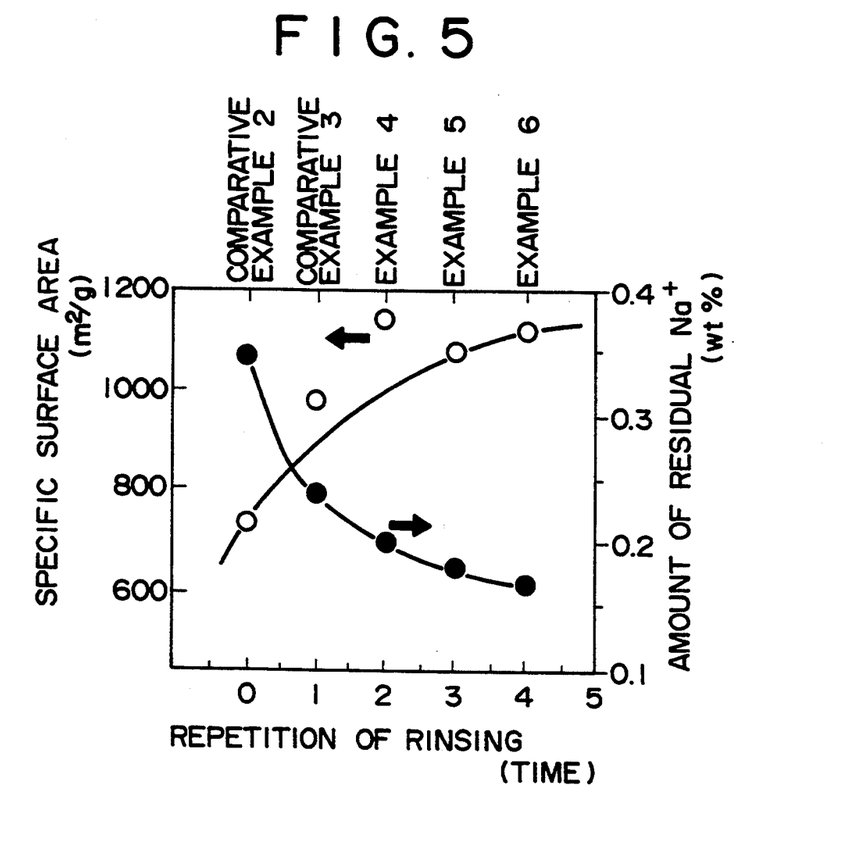
FIG. 5 is a graph showing the relation between the repetition of rinsing and the specific surface area of the layered porous silica and the amount of residual sodium ion ($Na^+$) according to Example 4 to 6.

The measured results are shown in FIG. 5. In the figure, the rinsing times of the layered porous silica is taken on the abscissa, the specific surface area of the layered porous silica is taken on the left ordinate, and the amount of residual sodium is taken on the right ordinate. The plots with open circles are for the specific surface area and those with closed circles are for the amount of residual sodium.

From the results shown in FIG. 5, it can be seen that the specific surface area of the layered porous silica increases with lowering amount of residual sodium ion ($Na^+$). More specifically, a layered porous silica having a specific surface area of 1,000 $m^2/g$ or more can be obtained when the layered porous silica is rinsed twice or more, and as a result the amount of residual sodium is decreased to 0.2% by weight or less. On the other hand, a layered porous silica with a specific surface area of less than 900 $m^2/g$ is obtained when the rinsing is conducted only once or not conducted, and as a result the amount of residual sodium remains more than 0.2% by weight.

EXAMPLE 7

In the present Example, the adsorption capacity for volatile fuel and the size of fine pores of a layered porous silica were measured.

A crystalline layered silicate used as a starting material was synthesized first. In this step, a powder of sodium silicate containing $Na_2O$ and $SiO_2$ at an $SiO_2$/$Na_2O$ ratio of 2.00 was calcined in an electric furnace at 700° C. for 6 hours to obtain $\delta$-$Na_2Si_2O_5$ crystals. Then, 15 g of the $\delta$-$Na_2Si_2O_5$ crystals thus obtained was immersed in 150 ml of water, and was subjected to stirring for 3 hours. The resulting dispersion was filtered off to obtain kanemite containing 100% by weight of water as the solid content.

In the subsequent step of interlayer expansion, 15 g (weight on drying) of the resulting kanemite was dispersed in 300 ml of a 0.1N aqueous solution of hexadecyltrimethylammonium chloride, and the resulting dispersion was charged in a Teflon autoclave to be heated at 65° C. for a duration of 1 week.

Then, the resulting dispersion was subjected to filtration in the rinsing step, and the solid content thus obtained was rinsed sufficiently.

In the subsequent pore-forming step, the sample obtained above was calcined at 700° C. under flow of air for 6 hours to synthesize a layered porous silica. The specific surface area of the porous silica was measured similarly to the method in Example 1 to 2 to obtain a value of 1,450 $m^2/g$.

The adsorption capacity of the resulting porous silica was measured. For comparison, the same was measured for an active carbon (Kuraraycoal, a product of Kuraray Co., Ltd.), a silica gel (#923, a product of Fuji Davison Chemical Co., Ltd.), and a silica-alumina (N631L, a product of JGC Corporation).

Figure 6:
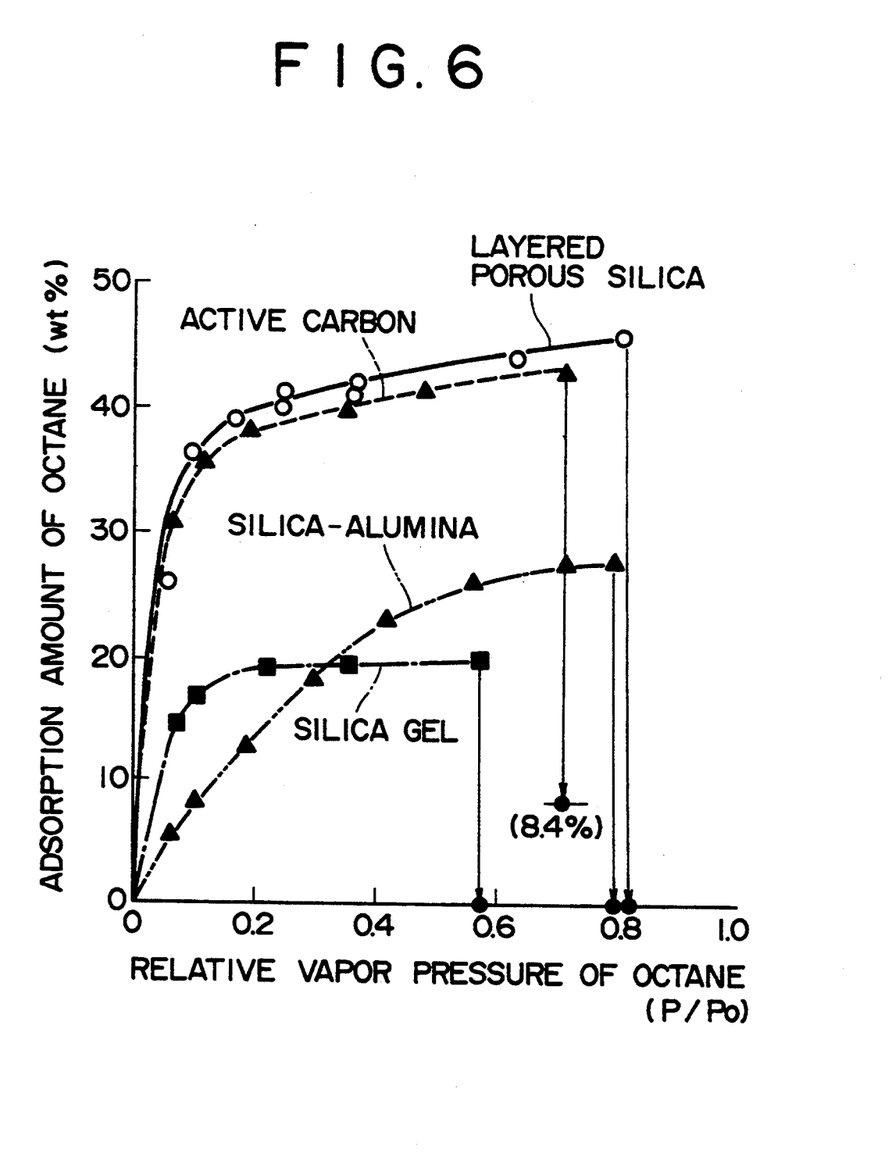
FIG. 6 is a graph showing an adsorption isotherm for octane according to Example 7.

The adsorption capacity was measured on samples shaped into granules from 1.0 to 3.0 mm in diameter, and octane was used as the organic substance to be adsorbed on the samples. The adsorption characteristics are shown as adsorption isotherms (25° C.) for octane in FIG. 6. In FIG. 6, the relative vapor pressure ($P/P_0$) of octane is taken on the abscissa and the amount (% by weight) of adsorbed octane is taken on the ordinate. The measurement was carried out by allowing the samples to adsorb the maximum amount of octane, followed by desorption thereof. The residual amount after the desorption is marked with closed circles in the figure.

FIG. 6 reads that the adsorbed amount of octane is about the same for the layered porous silica and active carbon. However, the residual amount of adsorbed octane after the desorption (marked with closed circles in the figure) is 8.4% for active carbon, which is in clear contrast with 0% for the layered porous silica, silica gel, and silica-alumina. Considering that the maximum amount of adsorption is 42% for active carbon, this signifies that 20% of the maximum adsorbed amount remains after desorption. The pore volume (cc/g) and the specific surface area ($m^2/g$) obtained by BET method for the four types of adsorbents above are given in Table 1. The pore distribution curves for the same adsorbents are shown in FIG.7.

TABLE 1

|  | Pore Volume (cc/g) | BET Specific Surface Area (m²/g) |
|---|---|---|
| Layered porous silica | 1.00 | 1,200 |
| Active carbon | 0.65 | 1,080 |
| Silica gel | 0.25 | 555 |
| Silica-alumina | 0.47 | 437 |

Figure 7:
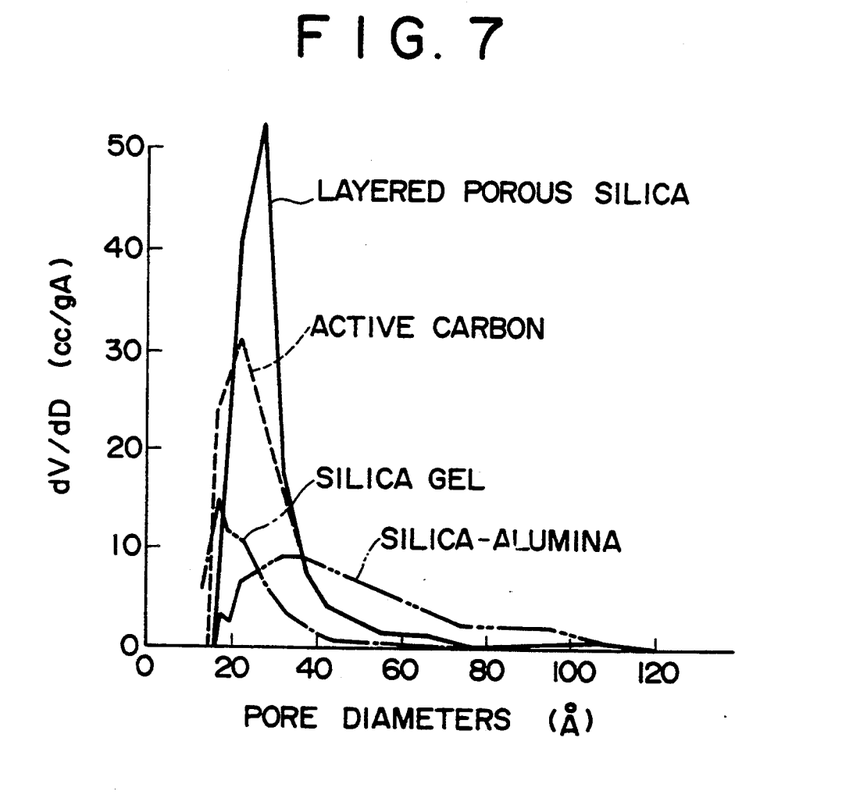
FIG. 7 is a graph showing the pore size distribution in layered porous silica of Example 7 and other types of absorbers.

It can be seen from Table 1and FIG. 7 that the layered porous silica according to the present invention has a larger specific surface area as measured according to BET method and a larger pore volume as compared with those of other three types of adsorbents.

It should be noted that the differential pore volume (dV/dD) referred in FIG. 7 is a value obtained by differentiation of the pore volume with the pore diameter (cc/gA).

EXAMPLE 8

Figure 8:
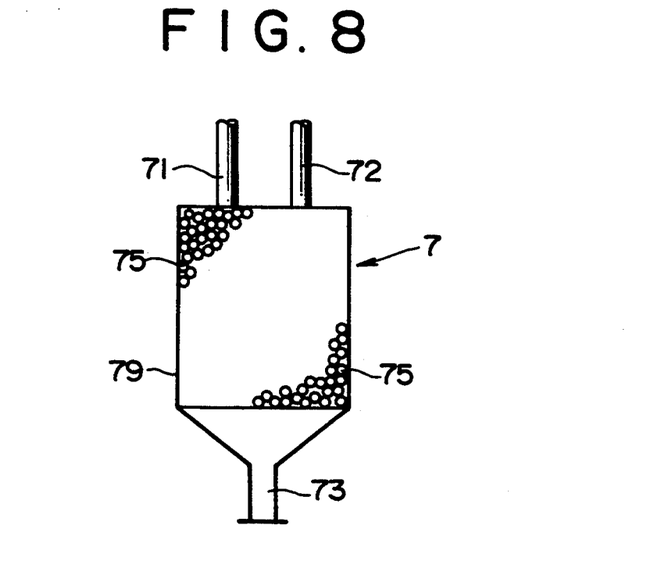
FIG. 8 illustrates a canister according to Example 8.

As shown in FIG. 8, an adsorbent vessel 79 was charged with a layered porous silica 75 according to the present invention to measure the adsorption capacity of the canister 7.

The canister 7 comprises an inlet pipe 71 and a purging pipe 72 on the upper side thereof, and a pipe 73 for introducing air is connected to the lower side of the absorbent vessel 79 having a volume of 1.4 l. The absorbent vessel 79 was charged with 630 g of layered porous silica 75 shaped in grains of 1 to 5 mm in diameter.

The adsorption capacity of the layered porous silica was measured by first allowing the canister 7 to stand at room temperature under an RH (relative humidity) of 100% for a duration of 1 hour, and then introducing octane vapor into the canister 7 through the inlet pipe 71 to measure the adsorbed amount of octane (amount of adsorbent).

The results are summarized in Table 2. The adsorbed amount signifies the weight of octane having adsorbed by 630 g of layered porous silica.

TABLE 2

| Adsorption repetition | Adsorbed amount of octane (g) | |
|---|---|---|
|  | Layered porous silica | Active carbon |
| First | 300 | 235 |
| Second | 295 | 188 |
| Third | 305 | 185 |

After the adsorption of octane, the air for purging was introduced into the vessel through the pipe 73 to thereby desorb the adsorbed octane.

A procedure similar to above was repeated twice to measure the adsorption capacity for the second and third absorption, and the amount of adsorbed octane (in g/amount of adsorbent) was measured for each adsorption. The results are summarized in Table 2.

For comparison, 560 g of an active carbon (Kuraraycoal) was charged in the same canister 7 as above to conduct the measurement in the similar manner. The results are given also in Table 2.

It can be seen from the results in Table 2 that the canister charged with the layered porous silica according to the present invention provides an excellent adsorption capacity well comparable to that at the first adsorption even after repeating the adsorption twice, without undergoing any degradation in the adsorption capacity.

In the case of active carbon, however, it can be seen that the adsorption capacity for the second adsorption is reduced to about 80% of that of the first time, and that the adsorption capacity decreases with increasing repetition of adsorption.

While the invention has been described in detail and with reference to specific embodiments thereof, it will be apparent to one skilled in the art that various changes and modifications can be made therein without departing from the spirit and scope thereof.

What is claimed is:

1. A heat resistant layered porous silica having a honeycomb porous structure comprising a plurality of waved or bent sheet layers of crystalline layered silicate, said sheet layers being superposed one after another in a manner that the spacing between the neighboring sheet layers is narrowed toward bent portions defining ridges thereof where the sheet layers are bonded by siloxane bonding and the spacings is expanded at parts between the bonded portions to form fine pores, wherein said layered porous silica contains alkali metal ions in an amount of 0.2% by weight or less and has a specific surface area of 1,000 m²/g or more.

2. A heat resistant layered porous silica as claimed in claim 1, wherein the crystalline layered silicate is kanemite synthesized from amorphous sodium silicate containing $Na_2O$ and $SiO_2$ at an $SiO_2/Na_2O$ ratio of nearly 2.

3. A heat resistant layered porous silica as claimed in claim 1, wherein the surface of the layered porous silica is hydrophobic.

4. A heat resistant layered porous silica as claimed in claim 1, wherein the diameter of the fine pores of the layered porous silica is distributed within a range of from 1 to 60Å.

5. A process for producing a heat resistant layered porous silica, which comprises:

expanding the interlayer spacings of a crystalline layered silicate containing not less than 10% by weight of water, by exchanging interlayer alkali metal ions being present in said crystalline layered silicate for cations of an organic substance to thereby introduce said cations of the organic substance into the spacings between the layers of said crystalline layered silicate;

rinsing the ion-exchanged crystalline layered silicate to remove free alkali metal ions which were released by the ion exchange step above; and calcining the ion-exchanged crystalline layered silicate to obtain layered porous silica by calcining said cations of the organic substance.

6. A process for producing a heat resistant layered porous silica as claimed in claim 5, wherein the layered porous silica is at least one selected from the group consisting of kanemite, sodium disilicate, makatite, ilerite, magadiite, and kenyaite.

7. A process for producing a heat resistant layered porous silica as claimed in claim 5, wherein the cation of the organic substance is at least one selected from group consisting of cations of an alkyltrimethylammonium, a dimethyldialkylammonium, an alkylammonium, and benzyltrimethylammonium.

8. A process for producing a heat resistant layered porous silica as claimed in claim 5, wherein the ion exchange step is conducted in the pH range of from 8 to 9, and is then followed by heating to a temperature range of from 30° to 90° C. before carrying out calcination.

9. A process for producing a heat layered porous silica as claimed in claim 5, wherein the rinsing step comprises repeating rinsing for at least twice.

10. A process for producing a heat resistant layered porous silica as claimed in claim 5, wherein the crystalline layered silicate is rendered porous by carrying out calcining in a temperature range of from 600° to 1,200° C.

11. A heat resistant layered porous silica as claimed in claim 1, wherein said neighboring sheet layers are partly bonded by siloxane bonds on portions of said neighboring sheet layers, without organic cations introduced therebetween.

12. A heat resistant layered porous silica as claimed in claim 1, wherein the specific surface area is over 1000 m$^2$/g after 6 hours' calcination at about 600° to about 800° C.

13. A heat resistant layered porous silica as claimed in claim 1, wherein the specific surface area is over 750 m$^2$/g after 6 hours' calcination at about 1000° C.

14. A heat resistant layered porous silica as claimed in claim 1, wherein the adsorption capacity does not decline due to repetitive adsorptions and desorptions of organic molecules.

15. A heat resistant layered porous silica as claimed in claim 1, wherein the interlayer spacings of the crystalline layered silicate are substantially free of organic cations.

16. A heat resistant layered porous silica as claimed in claim 1, wherein the water content of the crystalline layered silicate is over 20 wt %.

17. A heat resistant layered porous silica as claimed in claim 1, wherein the water content of the crystalline layered silicate is over 50 wt %.

18. A process for producing a heat resistant layered porous silica as claimed in claim 5, wherein the water content said crystalline layered silicate is over 20 wt %.

19. A process for producing a heat resistant layered porous silica as claimed in claim 5, wherein the water content of said crystalline layered silicate is over 50 wt %.

20. The process for producing a heat resistant layered porous silica as claimed in claim 5, wherein a specific surface area of 1000 m$^2$/g or more is attained by calcination of the crystalline layered silicate at a temperature between about 600° to about 800° C.

21. The process for producing a heat resistant layered porous silica as claimed in claim 5, wherein a specific surface area of 750 m$^2$/g or more is attained by calcination of the crystalline layered silicate at a temperature of about 1000° C.

* * * * *